US010236991B2

(12) United States Patent
Yu et al.

(10) Patent No.: US 10,236,991 B2
(45) Date of Patent: Mar. 19, 2019

(54) PROBABILISTICALLY SHAPED ORTHOGONAL FREQUENCY DIVISION MULTIPLEXING (71) Applicant: ZTE Corporation, Shenzhen, Guangdong (CN)

(72) Inventors: Jianjun Yu, Basking Ridge, NJ (US); Jianyang Shi, Morristown, NJ (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/910,803

(22) Filed: Mar. 2, 2018

(65) Prior Publication Data

US 2018/0262274 A1 Sep. 13, 2018

Related U.S. Application Data (60) Provisional application No. 62/470,112, filed on Mar. 10, 2017.

(51) Int. Cl.
H04B 10/548 (2013.01)
H04B 10/54 (2013.01)
H04L 27/26 (2006.01)
H04L 27/36 (2006.01)

(52) U.S. Cl.
CPC ......... H04B 10/548 (2013.01); H04B 10/541 (2013.01); H04L 27/2634 (2013.01); H04L 27/36 (2013.01)

(58) Field of Classification Search
CPC . H04B 10/548; H04B 10/541; H04L 27/2634; H04L 27/36
See application file for complete search history.

(56) References Cited

U.S. PATENT DOCUMENTS

| 2009/0220239 | A1* | 9/2009 | Armstrong | H04B 10/25133 398/81 |
| 2013/0343446 | A1* | 12/2013 | Eliaz | H04L 27/2628 375/230 |
| 2014/0072307 | A1* | 3/2014 | Zamani | H04B 10/616 398/79 |
| 2017/0222719 | A1* | 8/2017 | Haas | H04B 10/116 |
| 2018/0062766 | A1* | 3/2018 | Ooi | H04B 13/02 |
| 2018/0083716 | A1* | 3/2018 | Cho | H04B 7/0456 |

OTHER PUBLICATIONS

Buchali, F., et al., "Rate Adaptation and Reach Increase by Probabilistically Shaped 64-QAM: An Experimental Demonstration," Journal of Lightwave Technology, 34(7):1599-1609, Apr. 2016.
Cao, Z., et al., "Direct-Detection Optical OFDM Transmission System Without Frequency Guard Band," IEEE Photonics Technology Letters, 22(11):736-738, Jun. 2010.

(Continued)

Primary Examiner — Leslie C Pascal
(74) Attorney, Agent, or Firm — Perkins Coie LLP (57) ABSTRACT An optical signal transmission can use probabilistically shaped technique to improve performance and increase the transmission capacity. For instance, a 30-Gbit/s/λ probabilistically shaped (PS) 1024-QAM DFT-S OFDM was experimentally demonstrated over 40-km SSMF in an intensity modulation-direct detection system. The Achievable Information Rate (AIR) 9.5344-bits/QAM symbol of PS-1024-QAM modulation is first achieved in the experiment and shows feasibility for OFDM.

20 Claims, 11 Drawing Sheets (56) References Cited

OTHER PUBLICATIONS

Raphaeli, D., et al., "Constellation Shaping for Pragmatic Turbo-Coded Modulation With High Spectral Efficiency," IEEE Transactions on Communications, 52(3):341-345, Mar. 2004.

Rasmussen, J.C., et al., "Digital Signal Processing for Short Reach Optical Links," 2014 European Conference on optical Communication (ECOC), IEEE, Cannes, France, Paper Tu.1.3.3, pp. 1-3, Sep. 2014.

Silva, E., et al., "Experimental Comparison of Gains in Achievable Information Rates from Probabilistic Shaping and Digital Backpropagation for DP-256QAM/1024QAM WDM Systems," 42nd European Conference and Exhibition on Optical Communications, ECOC 2016, Düsseldorf, Germany, pp. 43-45, Sep. 2016.

Yan, W., et al., "80 km IM-DD Transmission for 100 Gb/s per Lane Enabled by DMT and Nonlinearity Management," Optical Fiber Communication Conference, OSA Technical Digest (online), Optical Society of America, San Francisco, California, USA, Paper M2I.4, 3 pages, Mar. 2014.

Yankov, M.P., et al., "Constellation Shaping for Fiber-Optic Channels With QAM and High Spectral Efficiency," IEEE Photonics Technology Letters, 26(23):2407-2410, Dec. 2014.

\* cited by examiner

PROBABILISTICALLY SHAPED ORTHOGONAL FREQUENCY DIVISION MULTIPLEXING

CROSS REFERENCE TO RELATED APPLICATIONS

This patent document claims the benefit of U.S. Provisional Patent Application No. 62/470,112, filed on Mar. 10, 2017. The entire content of the before-mentioned patent application is incorporated by reference as part of the disclosure of this document.

BACKGROUND

The wide-spread adoption of multimedia services, broadband internet, and cloud services, among others, has driven the demand of high transmission capacity of optical systems such as short-reach links, access, and metro networks.

SUMMARY

The present document discloses, among other things, an exemplary 30-Gbit/s/λ probabilistic shaping (PS)-1024-Quadrature Amplitude Modulation (QAM) Discrete Fourier Transform Spread (DFT-S) Orthogonal Frequency Division Multiplexing (OFDM) that can be transmitted and received over 40-km standard single mode fiber (SSMF) in an intensity modulation direct detection (IMDD) system. In an exemplary embodiment, the PS-1024-QAM format successfully achieved an Achievable Information Rate (AIR) of 9.5344-bits/QAM symbol without chromatic dispersion (CD) compensation, nonlinearity equalization and pre-equalization.

In an exemplary embodiment, a method of optical communication, implemented at a transmitter in an optical communication network, comprises mapping input data to complex symbols using a probabilistic shaped quadrature amplitude modulation (PS-QAM) scheme, converting the complex symbols from serial data to parallel data to obtain parallel complex symbols, generating an OFDM signal from the parallel complex symbols, adding a cyclic prefix to the OFDM signal, converting the OFDM signal with the cyclic prefix from parallel data to serial data to obtain a serial OFDM signal, generating a real-value OFDM signal from the serial OFDM signal, and transmitting the real-value OFDM signal.

In some embodiments, the PS-QAM scheme is based on a pre-determined pulse-amplitude modulation (PAM) level distribution. In some embodiments, the PS-QAM scheme comprises a PS-1024-QAM scheme.

In some embodiments, the generating of the OFDM signal from the parallel complex symbols includes performing an N-point Inverse Fast Fourier Transform (IFFT) on the parallel complex symbols, wherein N is an integer.

In some embodiments, the OFDM signal is a Discrete Fourier Transform-Spread (DFT-S) OFDM signal, and wherein the generating of the OFDM signal from the parallel complex symbols includes performing an L-point Fast Fourier Transform (FFT) on the parallel complex symbols to obtain an L-point DFT-S signal, and performing an N-point Inverse Fast Fourier Transform (IFFT) on the L-point DFT-S signal to obtain the DFT-S OFDM signal, wherein N is equals to a number of subcarriers of the DFT-S OFDM signal and wherein N and L are integers.

In some embodiments, the real-value OFDM signal is generated by performing subcarrier modulation on the serial OFDM signal.

In another exemplary embodiment, a method of optical communication, implemented at a receiver in an optical communication network, comprises receiving and converting a real-value OFDM signal to a complex-value OFDM signal, removing cyclic prefix from the complex-value OFDM signal, converting, after removing the cyclic prefix, the complex-value OFDM signal from serial data to parallel data to obtain a parallel OFDM signal, generating, from the parallel OFDM signal, complex symbols based on a probabilistic shaped quadrature amplitude modulation (PS-QAM) scheme, and de-mapping the complex symbols using a probabilistic shaped quadrature amplitude demodulation scheme to obtain an output signal.

In some embodiments, the generating of the complex symbols comprises performing an N-point Fast Fourier Transform (FFT) on the parallel OFDM signal to obtain intermediate complex symbols, wherein N is equal to a number of subcarriers of the OFDM signal, performing post-equalization on the intermediate complex symbols to obtain parallel equalized complex symbols, converting the parallel equalized complex symbols to serial complex symbols, performing decision directed least mean square (DD-LMS) equalization on the serial complex symbols to obtain the complex symbols.

In some embodiments, the OFDM signal is a Discrete Fourier Transform-Spread (DFT-S) OFDM signal, and the generating of the complex symbols comprises performing an N-point Fast Fourier Transform (FFT) on the parallel OFDM signal to obtain DFT-S complex symbols, wherein N is equal to a number of subcarriers of the DFT-S OFDM signal, performing post-equalization on the DFT-S complex symbols to obtain equalized DFT-S complex symbols, performing an L-point Inverse Fourier Transform (IFFT) on the equalized DFT-S complex symbols to obtain parallel equalized complex symbols, converting the parallel equalized complex symbols to serial complex symbols, and performing decision directed least mean square (DD-LMS) equalization on the serial complex symbols to obtain the complex symbols.

In yet another example aspect, the above-discussed methods may be implemented in a communication apparatus that includes a memory, a processor and a network interface. The processor may read instructions from the memory to implement the above-described methods.

These and other aspects, and example implementations and variations are set forth in the drawings, the description and the claims.

BRIEF DESCRIPTION OF THE DRAWINGS

FIG. 4A shows BER versus received optical power at back-to-back (BTB), 10-km and 20-km conditions for (i)

DFT-S OFDM without PS, (ii) DFT-S OFDM with PS, (iii) OFDM without PS, and (iv) OFDM with PS.

DETAILED DESCRIPTION

In the description, section headings are used only for ease of understanding and do not limit the disclosed embodiments and technology to any particular section. In this patent document, the term "exemplary" is used to mean "an example of" and does not imply that the described technique is an "ideal" or "preferred" technique. The term technique may refer to an embodiment using software, hardware, or a combination thereof.

Nowadays, demand for ultra-high data rate optical transmission is continuously growing. To meet the increasing demand on high data communication bandwidth, developers are continuously looking for new ways to carry a greater number of data bits over existing communication infrastructure. For instance, direct detection (DD) optical transmission is considered the more attractive and feasible solution due to the system construction cost, computation complexity and lower power consumption. Recently, probabilistic shaping (PS) has become a particularly promising technology in coherent optical system due to its higher spectral efficiency (SE), higher capacity and same computation complexity.

Compared with conventional quadrature amplitude modulation (QAM) schemes, PS-QAM modulation could overcome the lack in granularity with Shannon capacity, while standard QAM formats offer a coarse granularity in SE and a penalty in signal noise ratio (SNR). However, PS-QAM modulation is now investigated by theoretical analysis and simulation results in coherent optical system. The experimental results are rare and most of them focus on PS-64-QAM or PS-256QAM format with single carrier modulation. Some other experimental results of single carrier PS-1024-QAM modulation in coherent receiver show that the achievable information rate is only 5.9-bits/QAM symbol for PS dual-polarization (DP) 1024-QAM. However, the information rate for a uniform DP-1024-QAM could be 20-bits/QAM symbol (10-bits/Sa×2=20-bits/Sa) and the information rate for a uniform DP-8-QAM could be 6-bits/QAM symbol. So considering the forward error correction (FEC) threshold, the single carrier PS-1024-QAM modulation of some other experimental results could only support uniform DP-8-QAM format. Besides, orthogonal frequency-division multiplexing (OFDM) with optimized bit-loading and power-loading per subcarrier is another way to improve performance. Nevertheless, it can bring large computation complexity in the transmitter and receiver sides while PS-QAM modulation could save this additional cost. It is one interesting topic to investigate whether the system performance can be improved by using PS technology in OFDM system.

This patent document experimentally demonstrates an exemplary 30-Gbit/s/λ probabilistically shaped 1024-QAM DFT-S OFDM over 40-km SSMF in an IMDD system. The Achievable Information Rate (AIR) of 9.5344-bits/QAM symbol is successfully achieved by PS-1024-QAM format. As further discussed below, the comparison between OFDM and Discrete Fourier Transform-spread (DFT-S) OFDM with and without PS shows the feasibility for further performance improvement in bandwidth-constrained system. To the best of our knowledge, this is the first time a PS modulation format is employed in OFDM modulation, e.g., in a PS-1024-QAM configuration, and the high AIR is achieved under the FEC threshold.

Figure 1:
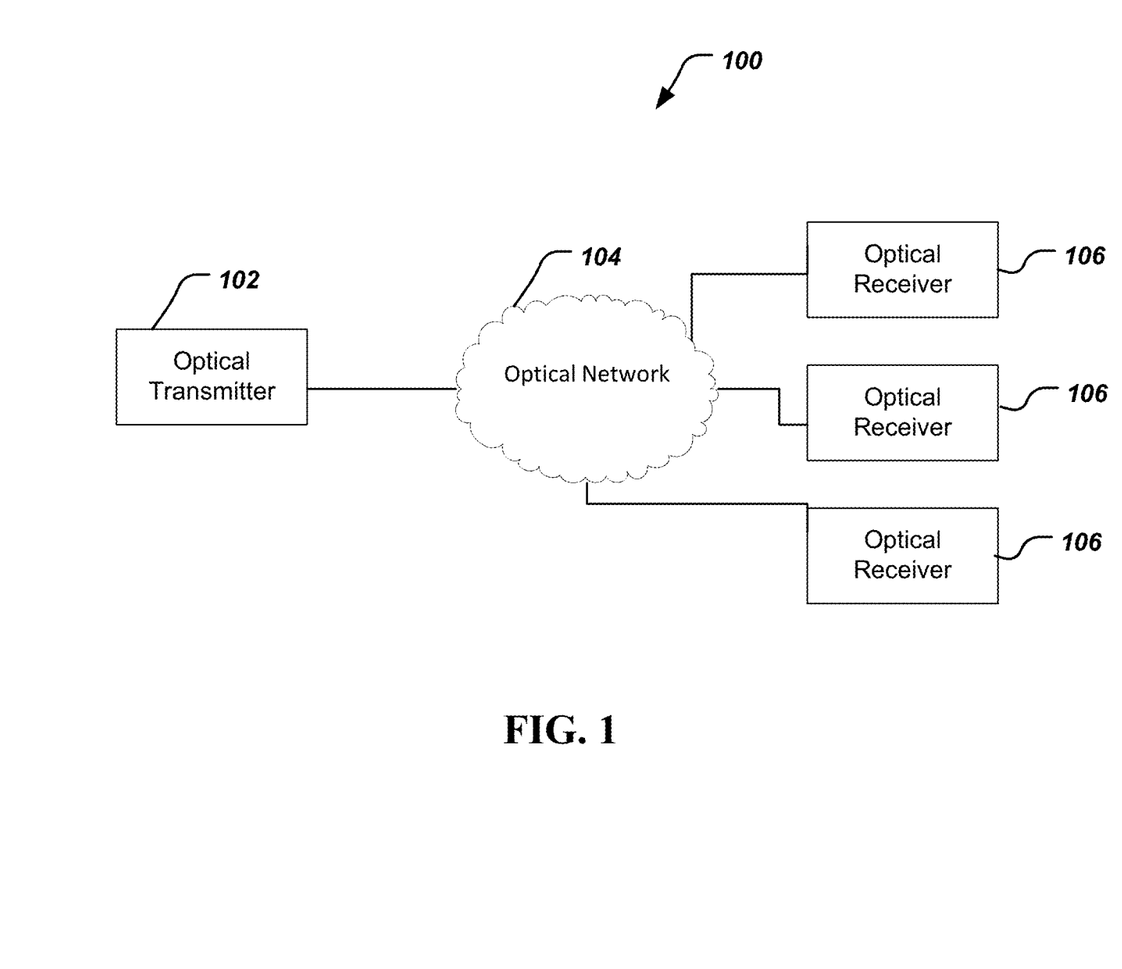
FIG. 1 shows an example block diagram of an optical communication system to transmit and receive signals.

FIG. 1 is a block diagram representation of an optical communication system 100 where the subject technology disclosed of this document can be implemented. An optical transmitter 102 transmits optical signals through an optical network 104 to one or more optical transceivers 106. The transmitted optical signals may go through intermediate optical equipment such as amplifiers, repeaters, switch, etc., which are not shown in FIG. 1 for clarity. The disclosed transmission techniques can be implemented in the transmission subsystem of the transmitter 102. The disclosed reception techniques can be implemented in the receiver subsystem of the receiver 106.

In optical communication, data is transmitted over optical carriers, e.g., glass or plastic optical fibers by modulating using a variety of different techniques. Some techniques implement data modulation in the electrical domain, e.g., by processing electronic signals. Alternatively, or in addition, data modulation can also be achieved in the optical domain.

Principle and Experiment Setup

One reason for introducing the exemplary probabilistic shaping is that most fiber communication systems can be power-constrained. In addition to the characteristics of the modulation formats in the linear area, the nonlinear limitations affect the signal, especially high-level signal. PS can facilitate sending of different level signals uses non-uniform probabilities. In some embodiments, PS can allow for the delivery of low-level signals with lower energy more often than the high-level signals with higher energy. Some benefits of using PS techniques can include saving the average transmitted energy and keeping the same signal quality with less transmitted energy. PS is useful for any kind of modulation formats, such as 16QAM, 32QAM, 64QAM or higher order.

Figure 2:
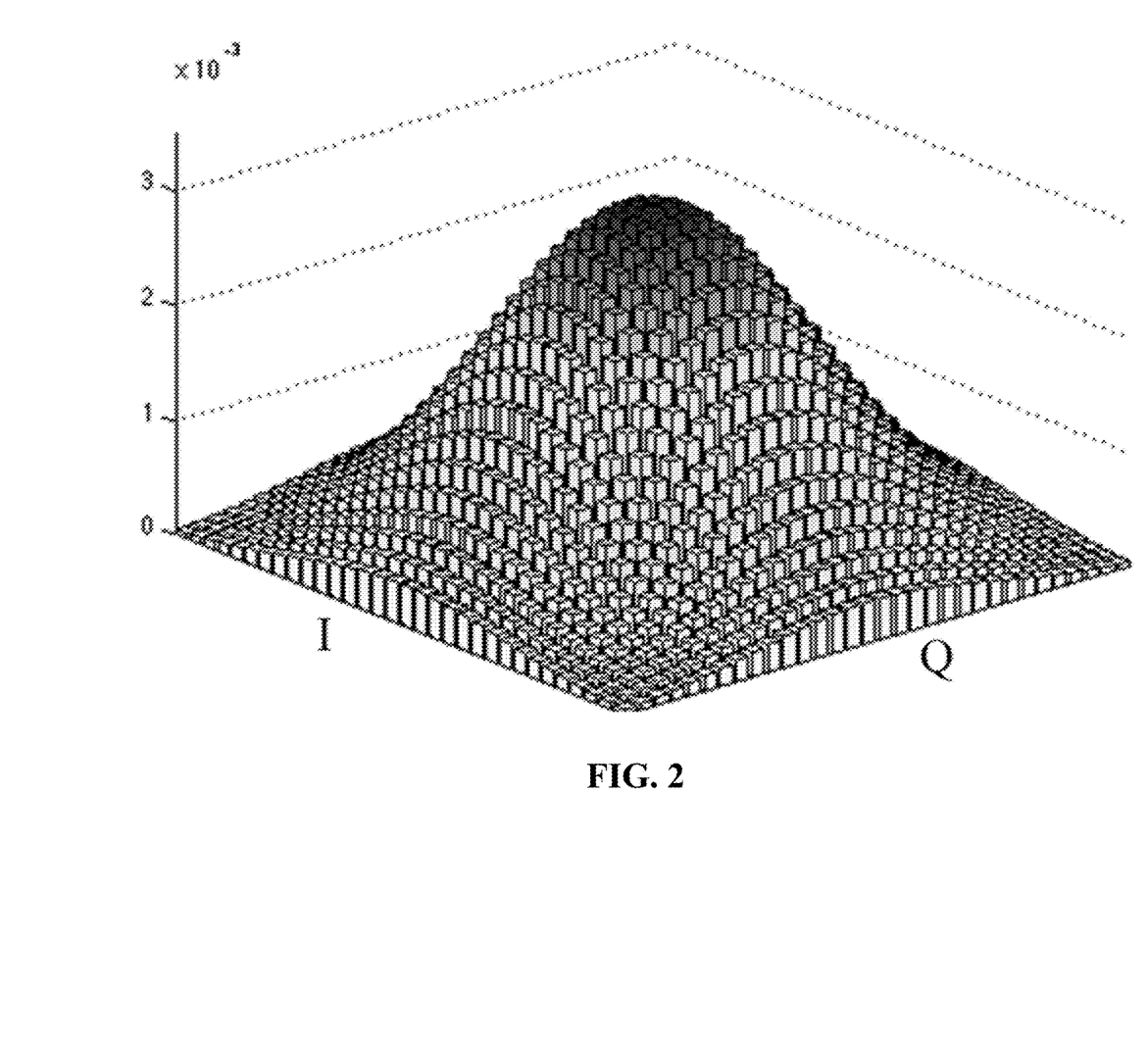
FIG. 2 shows a graphical illustration of probabilities for PS-1024-QAM.

FIG. 2 shows an example of the probabilities of signal points for PS-1024-QAM. The AIR is 9.5344-bits/QAM symbol and the pulse-amplitude modulation (PAM) level distribution for PS-1024-QAM is [0.0548, 0.0539, 0.0520, 0.0493, 0.0459, 0.0420, 0.0377, 0.0333, 0.0289, 0.0246, 0.0206, 0.0169, 0.0137, 0.0108, 0.0084, 0.0065]. Only four decimal places are shown here for brevity. In some embodiments, the PAM level distribution for PS-1024-QAM scheme may be pre-determined and provided to both the transmitter and receiver. In an exemplary PS scheme, the PAM level distribution may be dependent on the Maxwell-Boltzmann distribution related to the additive white Gaussian noise (AWGN) channel. By employing such an exemplary PS method, both power constrained and nonlinearity could be overcome and none of the nonlinearity equalization may be needed.

Figure 3A:
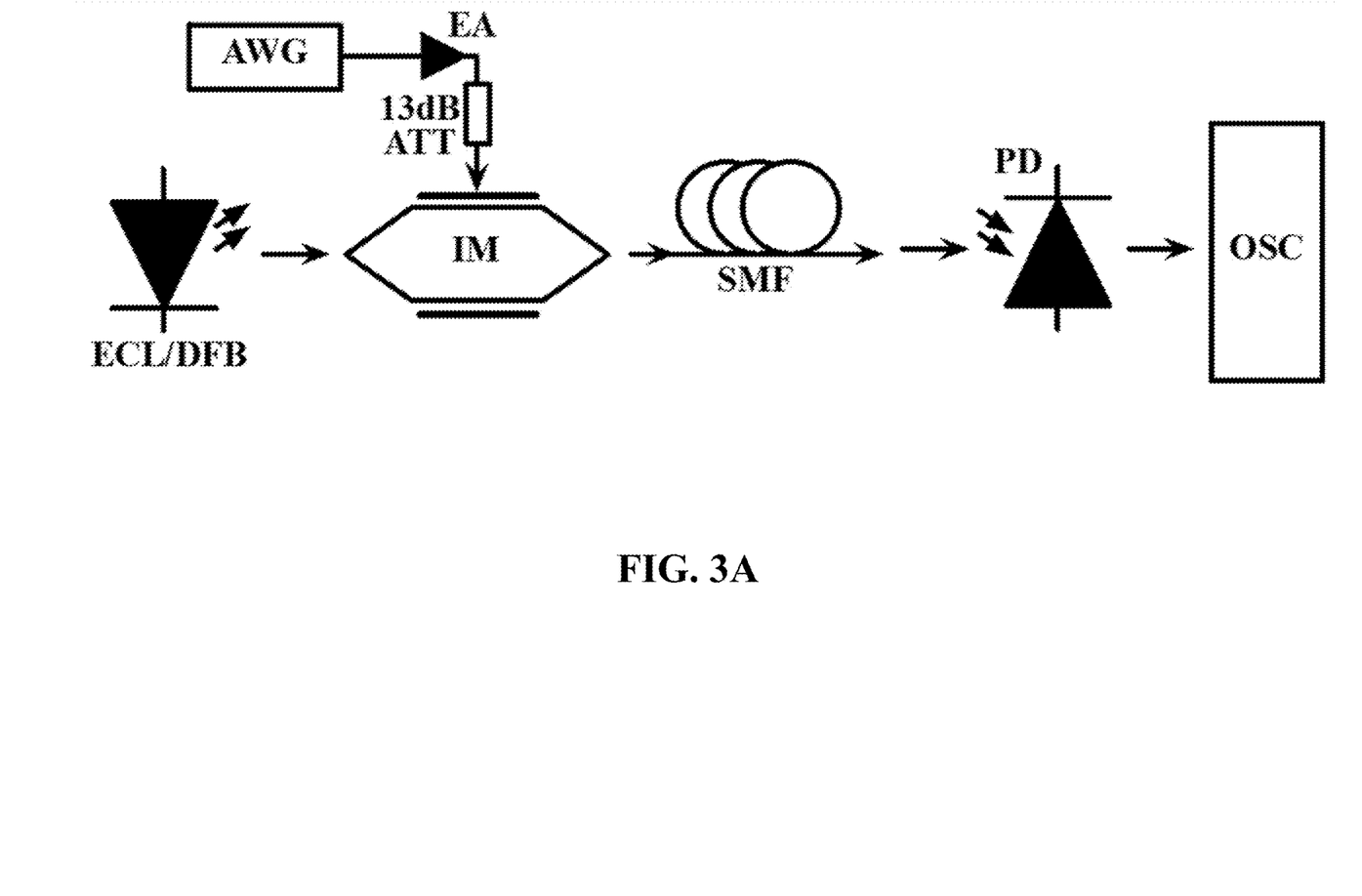
FIG. 3A shows a block diagram of an exemplary PS-1024-QAM system and experimental setup.

FIG. 3A shows a block diagram of an example setup of an exemplary 30-Gbit/s/λ PS-1024-QAM DFT-S OFDM over 40-km SSMF in an IMDD system. For lab testing, the drive signals can be generated by an exemplary 12-GSa/s arbitrary waveform generator (AWG), such as a Tektronix AWG7122B, with an offline Matlab® program. In an experimental setup, an AWG is used to perform an experiment. In real-world applications, user and control data can be used as inputs at the transmitter. The user data may be received from an external device or a user interface at a data input interface of the transmitter apparatus. In some embodiments, the user or control data used as inputs may be processed by a transmitter side DSP according to the flowchart shown in FIG. 3B.

In FIG. 3A, before driving the intensity modulator (IM), the signals can be amplified by an electrical amplifier (EA) and an electrical attenuator (ATT) can be utilized to fit the linear region of the modulator. In one aspect, the electrical amplify can have a 25-GHz bandwidth and a 25-dB gain, and the electrical attenuator can be a 13-dB electrical attenuator. A continual wave (CW) light generated by external cavity laser (ECL) with an exemplary line width of approximately 100 kHz or distributed feedback laser (DFB) with an exemplary line width of approximately 1 MHz at 1549.76-nm can be fed into the IM. The output signal of the IM can be transmitted over the SSMF. In one aspect, the IM can have a 25-GHz optical bandwidth. The system of FIG. 3A may be able to operate in absence of an Erbium Doped Fiber Amplifier (EDFA) to be used before and after SSMF fiber transmission. At the receiver side, the signals can be sampled by a sampling circuit (e.g., for lab testing, a digital real time oscilloscope may be used) after being detected by a photo detector (PD). In an exemplary embodiment, the receiver side can include a PD and digital signal processor (DSP) to process the received optical signal as further described in this patent document. In one aspect, the oscilloscope or a sampling circuit associated with the receiver side DSP can have a sampling rate of 50-GSa/s and the photo detector can have a bandwidth of 11-GHz.

Figure 3B:
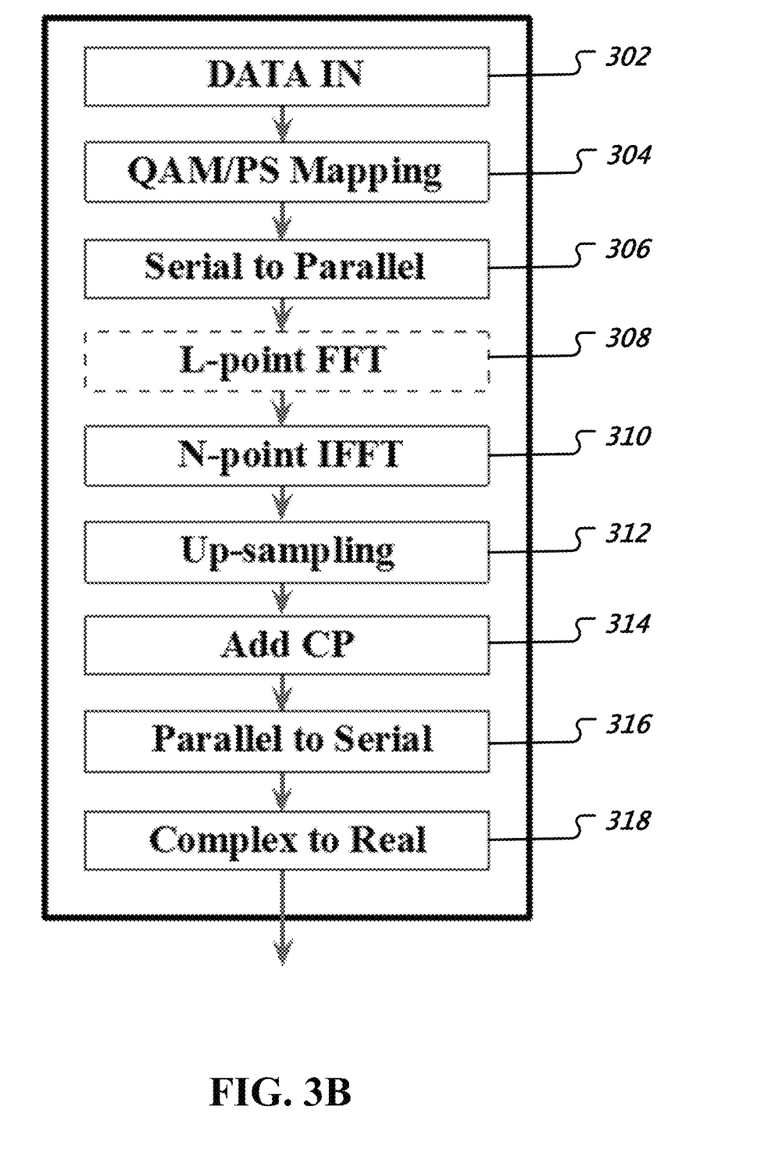
FIG. 3B shows an exemplary block diagram for a transmitter for a PS-1024-QAM system and experimental setup.

FIG. 3B shows an exemplary flowchart for a transmitter side digital signal processing for a PS-1024-QAM system and experimental setup. In an experimental setup, an AWG is used to perform the operations shown in FIG. 3B. As previously mentioned, in real-world applications, user and control data can be used as inputs at the transmitter. In some embodiments, a transmitter side DSP can perform or control a hardware circuit causing it to perform the operations shown in FIG. 3B. In FIG. 3B, an input data is received at a receiving operation 302 and a mapping operation 304 is performed on the input data where the input data is mapped into complex symbols, such as uniform 1024-QAM and PS-1024-QAM. At the first conversion operation 306, the complex symbols are converted from serial to parallel.

In some embodiments, an optional FFT operation 308 (shown with dashed lines) can be performed where an optional L-point FFT can be used to transform the parallel complex symbols to the L-point DFT-S FFT signal, such as a 2048-point DFT-S FFT signal. In embodiments where a L-point DFT-S FFT signal is obtained, a subsequent IFFT operation 310 can be performed where a N-point IFFT 310 can be used to transform the L-point DFT-S FFT signal to an OFDM signal with an L-point DFT-S FFT. The N value for the IFFT can be the number of subcarriers of the OFDM signal. In some other embodiments, the IFFT operation 310 can be performed without first performing an FFT operation 308 so that an N-point IFFT can be used to transform the parallel complex symbols to an OFDM signal without a DFT-S FFT signal.

In some embodiments, the OFDM signal with or without an L-point DFT-S FFT can be upsampled by performing an upsampling operation 312 to allow for better interpolation of transmitted data. At the cyclic prefix operation 314, cyclic prefix (CP) is added to the OFDM signal to alleviate the inter-symbol interference (ISI) incurred by chromatic dispersion (CD). At the second conversion operation 316, a parallel to serial (P/S) conversion is performed on OFDM signal with CP to obtain a serial OFDM signal with complex values. At the third conversion operation 318, a serial OFDM signal with complex values can be converted to a real-value OFDM, and subsequently transmitted over an optical fiber, as described in this patent document. In some implementations, the real-value OFDM signal can be generated by modulating the serial OFDM signal with the complex phase quantity of the serial OFDM signal. In some other implementation, real-value OFDM signal can be generated by using subcarrier modulation.

Figure 3C:
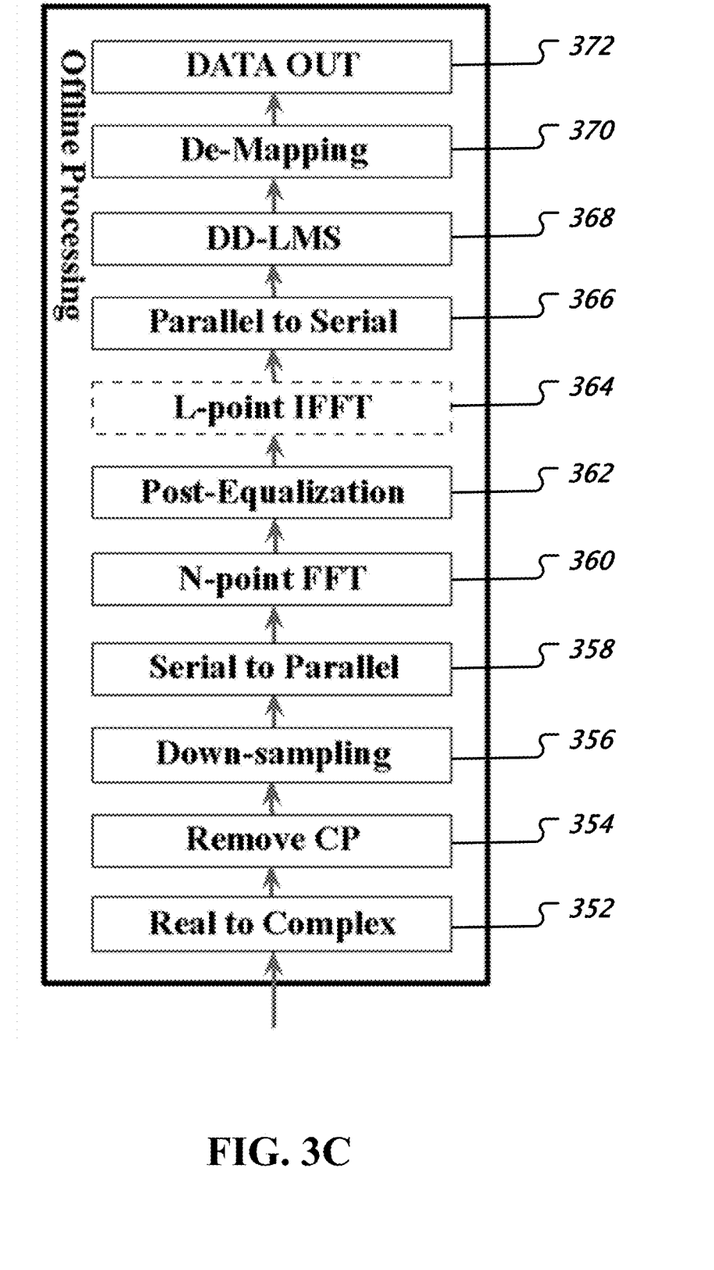
FIG. 3C shows an exemplary block diagram for digital signal processing for a PS-1024-QAM system and experimental setup.

FIG. 3C shows an exemplary flowchart for a receiver side digital signal processing for a PS-1024-QAM system and experimental setup. In the experiment, the baud rate for uniform 1024-QAM is 3-GBaud, while for PS-1024-QAM is 3.147-GBaud. In the experiment, the data rates are both 30-Gbit/s and an offline digital signal processing (DSP) is applied to demodulate the sampled signal by oscilloscope. In the offline process, only post-equalization and the decision directed least mean square (DD-LMS) algorithm are used in the receiver side. While offline processing may be used for system validation and testing, in real-world applications, an exemplary embodiment can use a DSP on a receiver side to perform the algorithms and operations shown in the exemplary digital signal processing of FIG. 3C.

At the conversion operation 352, the receiver side DSP receives the real-value OFDM signal transmitted over an SSMF and converts the real-value OFDM signal into a complex value OFDM signal. At the removing operation 354, the cyclic prefix is removed from the complex valued OFDM signal. In some embodiments, after the removing operation 354, a downsampling operation 356 can be performed on the complex value OFDM signal by removing the samples added to the sequence by the upsampling operation performed by the transmitter.

At the second conversion operation 348, the complex value OFDM signal can be converted from a serial to parallel to obtain a parallel complex value OFDM signal. Next, an FFT operation 360 is performed on the parallel complex value OFDM signal using an N-point FFT (N may be an integer power of 2) to obtain raw complex symbols associated with a probabilistic shaped quadrature amplitude modulation (PS-QAM).

At the post-equalization operation 362, the raw complex symbols are equalized to provide non-linear compensation to obtain equalized complex symbols. In some embodiments, post-equalization operation 362 can be performed to simultaneously estimate the response of a nonlinear system and capture the memory effect of devices or fiber. In some embodiments, where the received signal is an DFT-S OFDM signal, the output of the post-equalization operation 362 is equalized DFT-S complex symbols.

In some embodiments where the received OFDM signal is a DFT-S OFDM signal, a IFFT operation 364 (shown with dashed lines) is optionally performed after the post-equalization operation 362. At IFFT operation 364, an L-point IFFT can be used to transform the equalized DFT-S complex symbols to obtain parallel equalized complex symbols associated with a probabilistic shaped quadrature amplitude modulation (PS-QAM).

After the post-equalization operation 362 (for received OFDM signal without DFT-S FFT) or after the optional IFFT operation 364 (for received OFDM signal with DFT-S FFT), the parallel equalized complex signal can be converted to a serial complex OFDM signal at the third conversion operation 366.

At a second equalization operation 368, a decision directed least means square equalization can be performed to compensate phase and also to realize inter-symbol-interference equalization, which can be a linear procession.

At the demapping operation 370, the serial complex OFDM signal can be demapped by using a probabilistic shaping quadrature amplitude demodulation scheme to obtain output data 372.

Results and Discussion

Figure 4A:
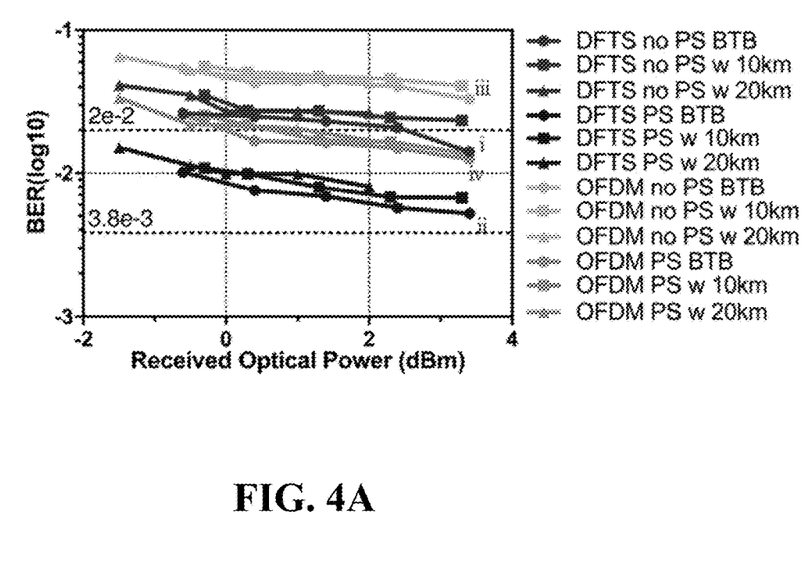

FIG. 4A shows the BER performance versus received optical power at back-to-back (BTB), 10-km and 20-km SSMF transmission cases. The numerals (i) to (iv) shown in FIG. 4A correspond to (i) DFT-S OFDM without PS, (ii) DFT-S OFDM with PS, (iii) OFDM without PS, and (iv) OFDM with PS. An optical attenuator is applied to adjust the received optical power for sensitivity measurement and the output power of IM is 7.8-dBm for some embodiments. Both DFT-S OFDM and OFDM show the performance improvements utilizing PS-1024-QAM, compared with uniform 1024-QAM.

Figure 4B:
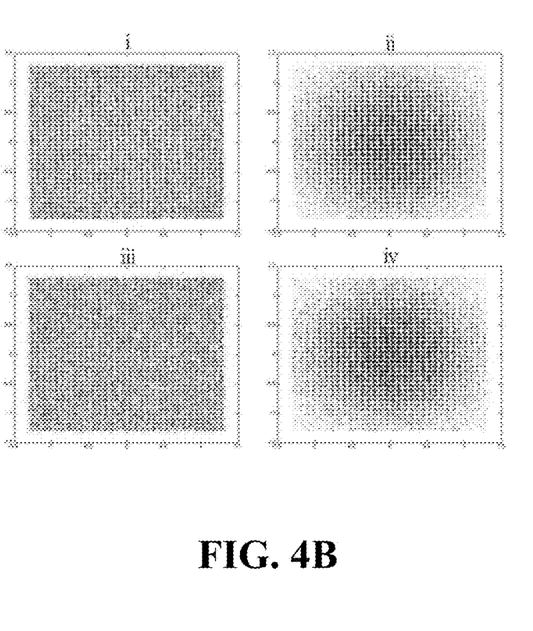
FIG. 4B shows constellations of (i) DFT-S OFDM without PS, (ii) DFT-S OFDM with PS, (iii) OFDM without PS, and (iv) OFDM with PS at BTB.

FIG. 4B shows constellations of (i) DFT-S OFDM without PS, (ii) DFT-S OFDM with PS, (iii) OFDM without PS, and (iv) OFDM with PS at BTB. As shown in FIG. 4B, the constellations of PS-1024-QAM are distributing in the center, while uniform 1024-QAM is not. The improvements between DFT-S OFDM and OFDM are due to the lower peak to average power ratio (PAPR) by DFT-S. The BER performance with different fiber distances also shows that the PS method does not introduce more penalty between BTB and fiber transmission.

Figure 5A:
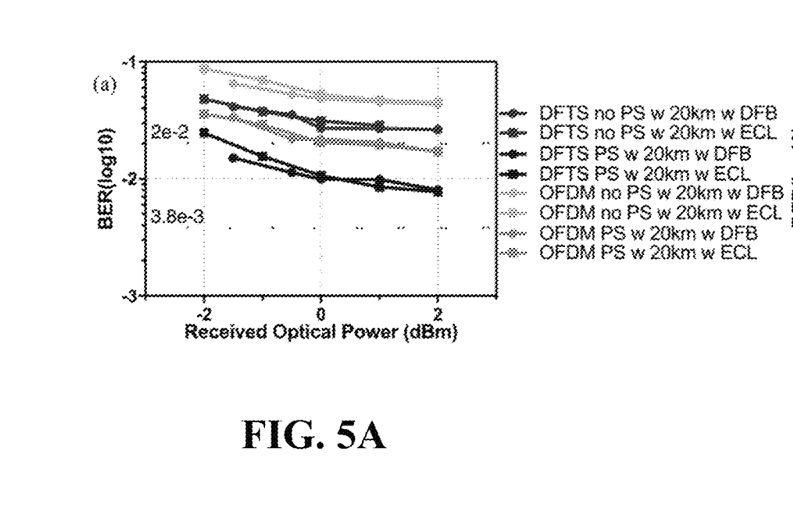
FIG. 5A shows the BER versus received optical power for DFT-S OFDM with/without PS and OFDM with/without PS at 20-km case with DFB or ECL.

The BER performance with different lasers is shown in FIG. 5A. For the four kinds of OFDM signal, there are no penalties between ECL and DFB laser. This shows that the exemplary system has robustness with the line width and output power of lasers. It also shows the feasibility of low cost short distance fiber transmission system.

Figure 5B:
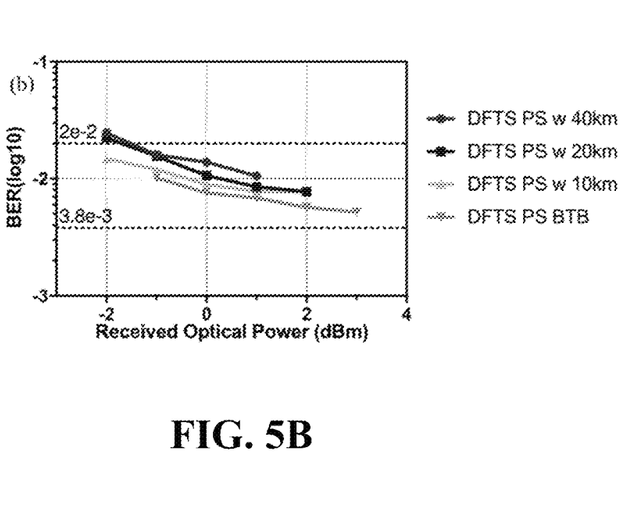
FIG. 5B shows the BER versus received optical power for DFT-S OFDM with/without PS and OFDM with/without PS at BTB, 10-km, 20-km AND 40-km cases.

FIG. 5B shows the BER performance versus the received optical power employing the exemplary PS-1024-QAM DFT-S OFDM at different fiber transmission distances. Without chromatic dispersion (CD) compensation, nonlinearity equalization and pre-equalization, 40-km SSW fiber transmission with PS-1024-QAM is experimental demonstrated under FEC threshold of $2 \times 10^{-2}$. The AIR of this PS-1024-QAM system is 9.5344-bits/QAM symbol, and it is the first time to achieve PS-1024-QAM OFDM signal transmission under the FEC threshold.

Conclusions

An exemplary 30-Gbit/s/λ PS-1024-QAM DFT-S OFDM over 40-km SSMF is experimentally demonstrated in an IMDD system. Without CD compensation, nonlinearity equalization and pre-equalization, the AIR of 9.5344-bits/QAM symbol is successfully achieved by PS-1024-QAM format. The comparisons of OFDM and DFT-S OFDM with and without PS show the feasibility for further performance improvement in short distance optical transmission. To the best of our knowledge, this is the first time a PS-1024-QAM format is employed in OFDM modulation and the high AIR is achieved under the FEC threshold.

Figure 6:
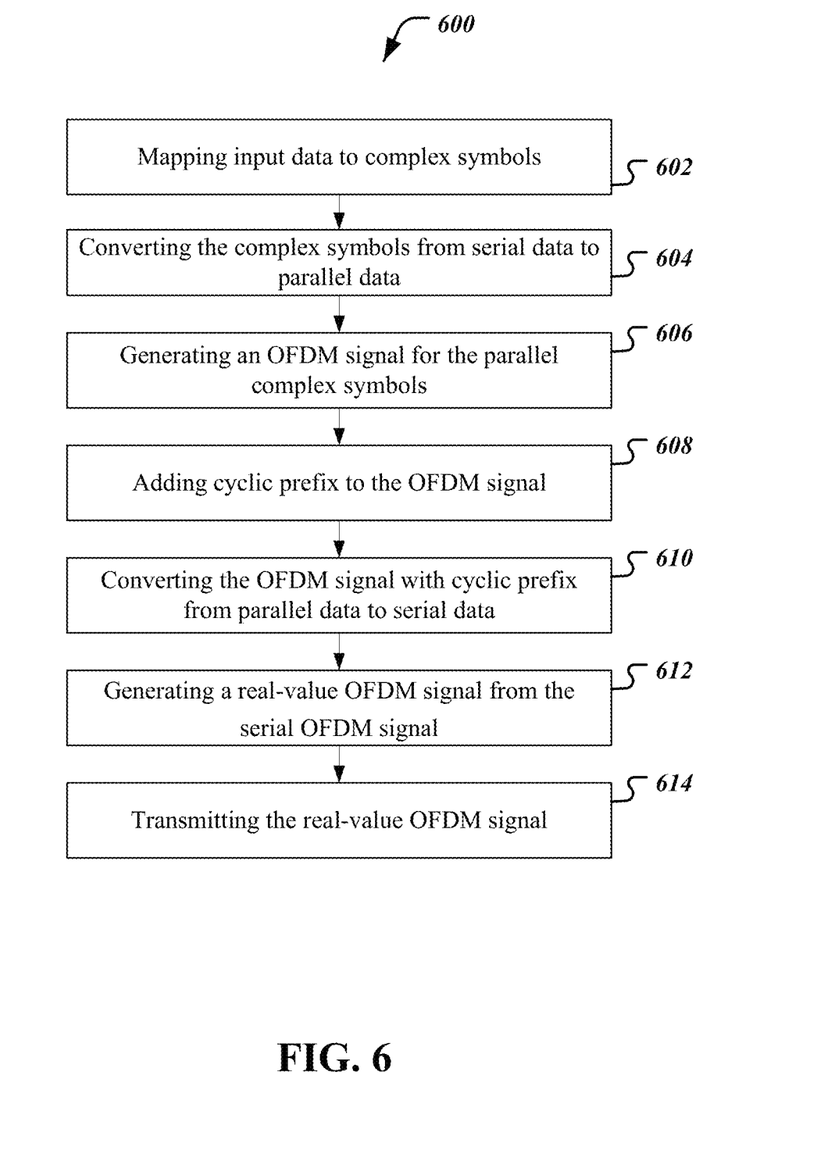
FIG. 6 is a flowchart of an example method of optical transmission.

FIG. 6 shows an exemplary flowchart 600 of an optical transmission. At the mapping operation 602, input data is mapped into complex symbols, using a PS-QAM scheme, for example, a PS-1024-QAM. At the converting operation 604, the complex symbols are converted from serial data to parallel data to obtain parallel complex symbols. At the generating operation 606, the OFDM signal is generated from the parallel complex symbols. In some embodiments, at the generating operation 606, an N-point IFFT 15 performed on the complex symbols to generate an OFDM signal without DFT-S. In some other embodiments, at the generating operation 606, an L-point FFT is performed on the parallel complex symbols followed by an N-point IFFT to obtain a DFT-S OFDM signal. At the adding operation 608, a cyclic prefix (CP) is added such that inter-symbol interference (ISI) that may be incurred by CD can be alleviated. At the second converting operation 610, the OFDM signal with cyclic prefix is converted from parallel data to serial data to obtain a serial OFDM signal. At the generating operation 612, the serial OFDM signal that includes complex values is converted to a real-value OFDM signal. At the transmitting operation 614, the real-value OFDM signal can be transmitted over an optical fiber.

Figure 7:
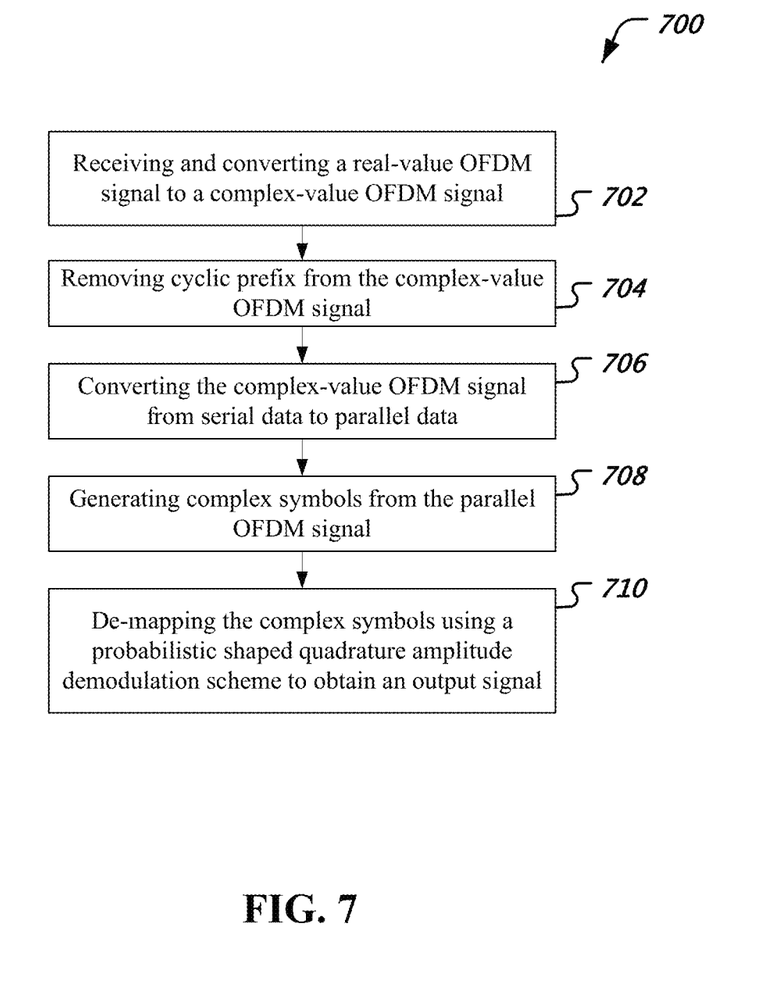
FIG. 7 is a flowchart of an example method of optical reception.

FIG. 7 shows an exemplary flowchart 700 of an optical reception. At the receiving operation 702, the real-value OFDM is received and converted from real to complex values. At the removing operation 704, the cyclic prefix (CP) is removed from the complex value OFDM signal. At the converting operation 706, the complex value OFDM signal is converted from serial to parallel data to obtain a parallel OFDM signal. At the generating operation 708, the parallel OFDM signal is processed to obtain complex symbols that are based on a PS-QAM scheme. In some embodiments where the received OFDM signal is not a DFT-S OFDM signal, complex symbols can be generated by performing the N-point FFT, post-equalization, conversion from parallel to serial data, and DD-LMS equalization, as described in FIG. 3C. In some other embodiments where the received OFDM signal is a DFT-S OFDM, complex symbols can be generated by performing the N-point FFT, post-equalization, L-point IFFT, conversion from parallel to serial data, and DD-LMS equalization, as described in FIG. 3C. At the de-mapping operation 710, an output signal is obtained by demapping the complex symbols using a probabilistic shaped quadrature amplitude demodulation scheme.

Figure 8:
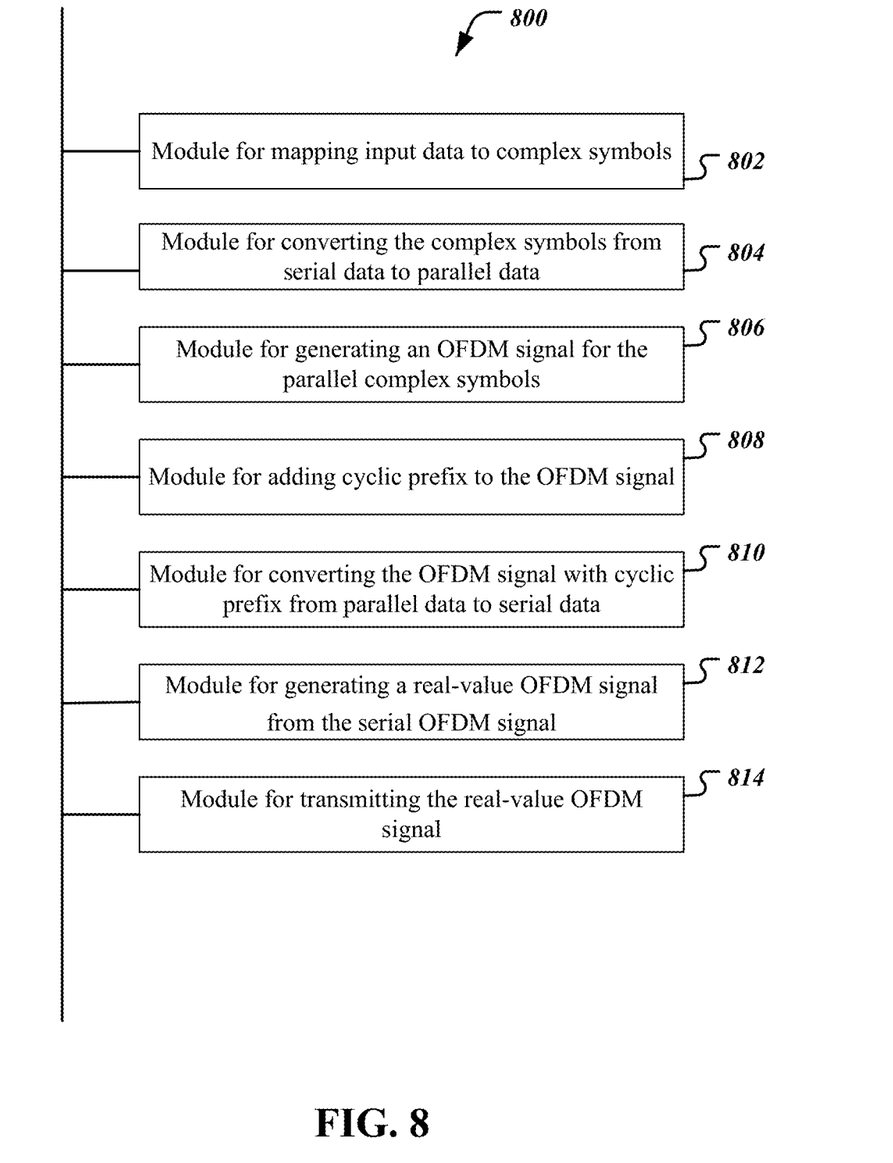
FIG. 8 shows a block diagram of an exemplary optical transmitter.

FIG. 8 shows a block diagram of an exemplary optical transmitter. The optical transmitter includes or is associated with a processor and a memory. The memory stores instructions that, when executed, cause the processor to perform the operations associated with the modules of the optical transmitter, for example, as shown in FIG. 8. The module for mapping 802, maps input data into complex symbols, using a PS-QAM scheme, for example, a PS-1024-QAM. The module for converting 804, converts complex symbols from serial data to parallel data to obtain parallel complex symbols. The module for generating 806, generates the OFDM signal from the parallel complex symbols. In some embodiments, module for generating 806 can perform a N-point IFFT on the complex symbols to generate an OFDM signal without DFT-S. In some other embodiments, the module for generating 806 can perform an L-point FFT on the parallel complex symbols followed by an N-point IFFT to obtain a DFT-S OFDM signal. The module for adding 808 adds a cyclic prefix (CP). The module for converting 810 converts OFDM signal with cyclic prefix from parallel data to serial data to obtain a serial OFDM signal. The module for generating 812 converts the serial OFDM signal that includes complex values to a real-value OFDM signal. The module for transmitting 814, such as a transmitter, transmits the real-value OFDM signal over an optical fiber.

Figure 9:
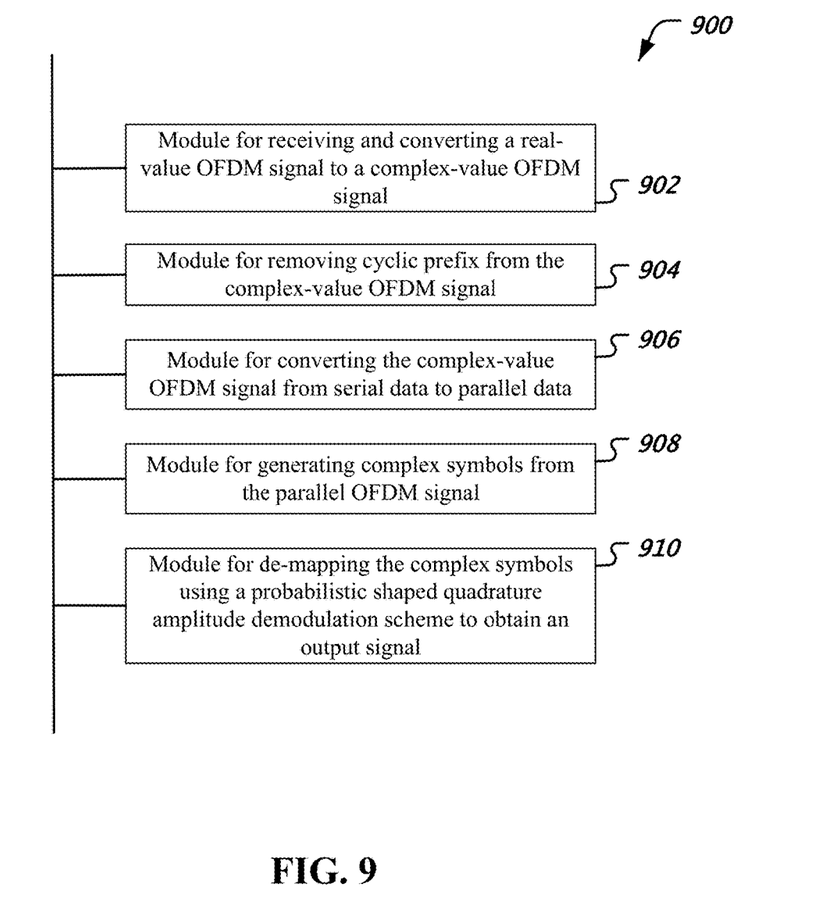
FIG. 9 shows a block diagram of an exemplary optical receiver.

FIG. 9 shows a block diagram of an exemplary optical receiver. The optical receiver includes or is associated with a processor and a memory. The memory stores instructions that, when executed, cause the processor to perform the operations associated with the modules of the optical receiver, for example, as shown in FIG. 9. The module for receiving 902, such as a receiver, receives the real-value OFDM and converts from real to complex values. The module for removing 904, removes the cyclic prefix (CP) from the complex value OFDM signal. The module for converting 906, converts the complex value OFDM signal from serial to parallel data to obtain a parallel OFDM signal. The module for generating 908, processes the parallel OFDM signal to obtain complex symbols that are based on a PS-QAM scheme. In some embodiments where the received OFDM signal is not a DFT-S OFDM signal, the module for generating 908 can generate complex symbols by performing the N-point FFT, post-equalization, conversion from parallel to serial data, and DD-LMS equalization, as described in FIG. 3C. In some other embodiments where the received OFDM signal is a DFT-S OFDM, module for generating 908 can generate the complex symbols by performing the N-point FFT, post-equalization, L-point IFFT, conversion from parallel to serial data, and DD-LMS equalization, as described in FIG. 3C. The module for de-mapping 910 de-maps the complex symbols using a probabilistic shaped quadrature amplitude demodulation scheme to obtain an output signal.

Any known algorithms to perform probabilistic shaping can be utilized. In some embodiments, probabilistic shaping can be accomplished by the methods described in Raphaeli, et al., Constellation Shaping for Pragmatic Turbo-Coded Modulation With High Spectral Efficiency, or Yankov et. al., Constellation Shaping for Fiber-Optic Channels With QAM and High Spectral Efficiency, or Buchali et al., Rate Adaptation and Reach Increase by Probabilistically Shaped 64-QAM: An Experimental Demonstration, or Silva et al., Experimental Comparison of Gains in Achievable Information Rates from Probabilistic Shaping and Digital Back-propagation for DP-256QAM/1024QAM WDM Systems.

It will be appreciated that the patent document discloses an optical signal transmission that can use probabilistically shaped technique to improve performance and increase the transmission capacity. For instance, a 30-Gbit/s/λ probabilistically shaped (PS) 1024-QAM DFT-S OFDM was experimentally demonstrated over 40-km SSMF in an IMDD system. The Achievable Information Rate (AIR) 9.5344-bits/QAM symbol of PS-1024-QAM modulation is first achieved in the experiment and shows feasibility for OFDM.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination.

Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of optical communication, implemented at a transmitter in an optical communication network, comprising:
   mapping input data to complex symbols using a probabilistic shaped quadrature amplitude modulation (PS-QAM) scheme;
   converting the complex symbols from serial data to parallel data to obtain parallel complex symbols;
   generating an OFDM signal from the parallel complex symbols, wherein the OFDM signal is a Discrete Fourier Transform-Spread (DFT-S) OFDM signal, and wherein the generating of the OFDM signal from the parallel complex symbols includes:
      performing an L-point Fast Fourier Transform (FFT) on the parallel complex symbols to obtain an L-point DFT-S signal, and
      performing an N-point Inverse Fast Fourier Transform (IFFT) on the L-point DFT-S signal to obtain the DFT-S OFDM signal, wherein N is equals to a number of subcarriers of the DFT-S OFDM signal and wherein N and L are integers;
   adding a cyclic prefix to the OFDM signal;
   converting the OFDM signal with the cyclic prefix from parallel data to serial data to obtain a serial OFDM signal;
   generating a real-value OFDM signal from the serial OFDM signal; and
   transmitting the real-value OFDM signal.

2. The method of claim 1, wherein the PS-QAM scheme is based on a pre-determined pulse-amplitude modulation (PAM) level distribution.

3. The method of claim 1, wherein the PS-QAM scheme comprises a PS-1024-QAM scheme.

4. The method of claim 1, wherein the real-value OFDM signal is generated by performing subcarrier modulation on the serial OFDM signal.

5. A method of optical communication, implemented at a receiver in an optical communication network, comprising:
   receiving and converting a real-value OFDM signal to a complex-value OFDM signal;
   removing cyclic prefix from the complex-value OFDM signal;
   converting, after removing the cyclic prefix, the complex-value OFDM signal from serial data to parallel data to obtain a parallel OFDM signal;
   generating, from the parallel OFDM signal, complex symbols based on a probabilistic shaped quadrature amplitude modulation (PS-QAM) scheme, wherein the generating of the complex symbols comprises:
      performing an N-point Fast Fourier Transform (FFT) on the parallel OFDM signal to obtain intermediate complex symbols, wherein N is equal to a number of subcarriers of the OFDM signal;
      performing post-equalization on the intermediate complex symbols to obtain parallel equalized complex symbols;
      converting the parallel equalized complex symbols to serial complex symbols; and
      performing decision directed least mean square (DD-LMS) equalization on the serial complex symbols to obtain the complex symbols; and
   de-mapping the complex symbols using a probabilistic shaped quadrature amplitude demodulation scheme to obtain an output signal.

6. A method of optical communication, implemented at a receiver in an optical communication network, comprising:
   receiving and converting a real-value OFDM signal to a complex-value OFDM signal;
   removing cyclic prefix from the complex-value OFDM signal;
   converting, after removing the cyclic prefix, the complex-value OFDM signal from serial data to parallel data to obtain a parallel OFDM signal;
   generating, from the parallel OFDM signal, complex symbols based on a probabilistic shaped quadrature amplitude modulation (PS-QAM) scheme, wherein the OFDM signal is a Discrete Fourier Transform-Spread (DFT-S) OFDM signal, and wherein the generating of the complex symbols comprises:
      performing an N-point Fast Fourier Transform (FFT) on the parallel OFDM signal to obtain DFT-S complex symbols, wherein N is equal to a number of subcarriers of the DFT-S OFDM signal;
      performing post-equalization on the DFT-S complex symbols to obtain equalized DFT-S complex symbols;
      performing an L-point Inverse Fourier Transform (IFFT) on the equalized DFT-S complex symbols to obtain parallel equalized complex symbols;
      converting the parallel equalized complex symbols to serial complex symbols; and
      performing decision directed least mean square (DD-LMS) equalization on the serial complex symbols to obtain the complex symbols; and
   de-mapping the complex symbols using a probabilistic shaped quadrature amplitude demodulation scheme to obtain an output signal.

7. The method of claim 5, wherein the PS-QAM scheme is based on a pre-determined pulse-amplitude modulation (PAM) level distribution.

8. The method of claim 5, wherein the PS-QAM scheme comprises a PS-1024-QAM scheme.

9. The method of claim 6, wherein the PS-QAM scheme is based on a pre-determined pulse-amplitude modulation (PAM) level distribution.

10. The method of claim 6, wherein the PS-QAM scheme comprises a PS-1024-QAM scheme.

11. A wireless communication device comprising a processor and a memory, wherein the memory stores instructions that, when executed, cause the processor to:
   map input data to complex symbols using a probabilistic shaped quadrature amplitude modulation (PS-QAM) scheme;
   convert the complex symbols from serial data to parallel data to obtain parallel complex symbols;
   generate an OFDM signal from the parallel complex symbols, wherein the OFDM signal is a Discrete Fourier Transform-Spread (DFT-S) OFDM signal, and wherein the instructions to generate the OFDM signal from the parallel complex symbols includes instructions to:
perform an L-point Fast Fourier Transform (FFT) on the parallel complex symbols to obtain an L-point DFT-S signal, and
perform an N-point Inverse Fast Fourier Transform (IFFT) on the L-point DFT-S signal to obtain the DFT-S OFDM signal, wherein N is equals to a number of subcarriers of the DFT-S OFDM signal and wherein N and L are integers;
add a cyclic prefix to the OFDM signal;
convert the OFDM signal with the cyclic prefix from parallel data to serial data to obtain a serial OFDM signal;
generate a real-value OFDM signal from the serial OFDM signal; and
transmit the real-value OFDM signal.

12. The wireless communication device of claim 11, wherein the PS-QAM scheme is based on a pre-determined pulse-amplitude modulation (PAM) level distribution.

13. The wireless communication device of claim 11, wherein the PS-QAM scheme comprises a PS-1024-QAM scheme.

14. The wireless communication device of claim 11, wherein the instructions to generate real-value OFDM signal includes instructions to perform subcarrier modulation on the serial OFDM signal.

15. A wireless communication device comprising a processor and a memory, wherein the memory stores instructions that, when executed, cause the processor to:
receive and converting a real-value OFDM signal to a complex-value OFDM signal;
remove cyclic prefix from the complex-value OFDM signal;
convert, after removing the cyclic prefix, the complex-value OFDM signal from serial data to parallel data to obtain a parallel OFDM signal;
generate, from the parallel OFDM signal, complex symbols based on a probabilistic shaped quadrature amplitude modulation (PS-QAM) scheme, wherein the instructions to generate the complex symbols comprises instructions to:
perform an N-point Fast Fourier Transform (FFT) on the parallel OFDM signal to obtain intermediate complex symbols, wherein N is equal to a number of subcarriers of the OFDM signal;
perform post-equalization on the intermediate complex symbols to obtain parallel equalized complex symbols;
convert the parallel equalized complex symbols to serial complex symbols; and
perform decision directed least mean square (DD-LMS) equalization on the serial complex symbols to obtain the complex symbols; and
de-map the complex symbols using a probabilistic shaped quadrature amplitude demodulation scheme to obtain an output signal.

16. The wireless communication device of claim 15, wherein the PS-QAM scheme is based on a pre-determined pulse-amplitude modulation (PAM) level distribution.

17. The wireless communication device of claim 15, wherein the PS-QAM scheme comprises a PS-1024-QAM scheme.

18. A wireless communication device comprising a processor and a memory, wherein the memory stores instructions that, when executed, cause the processor to:
receive and converting a real-value OFDM signal to a complex-value OFDM signal;
remove cyclic prefix from the complex-value OFDM signal;
convert, after removing the cyclic prefix, the complex-value OFDM signal from serial data to parallel data to obtain a parallel OFDM signal;
generate, from the parallel OFDM signal, complex symbols based on a probabilistic shaped quadrature amplitude modulation (PS-QAM) scheme, wherein the OFDM signal is a Discrete Fourier Transform-Spread (DFT-S) OFDM signal, and wherein the instructions to generate the complex symbols comprises instructions to:
perform an N-point Fast Fourier Transform (FFT) on the parallel OFDM signal to obtain DFT-S complex symbols, wherein N is equal to a number of subcarriers of the DFT-S OFDM signal;
perform post-equalization on the DFT-S complex symbols to obtain equalized DFT-S complex symbols;
perform an L-point Inverse Fourier Transform (IFFT) on the equalized DFT-S complex symbols to obtain parallel equalized complex symbols;
convert the parallel equalized complex symbols to serial complex symbols; and
perform decision directed least mean square (DD-LMS) equalization on the serial complex symbols to obtain the complex symbols; and
de-map the complex symbols using a probabilistic shaped quadrature amplitude demodulation scheme to obtain an output signal.

19. The wireless communication device of claim 18, wherein the PS-QAM scheme is based on a pre-determined pulse-amplitude modulation (PAM) level distribution.

20. The wireless communication device of claim 18, wherein the PS-QAM scheme comprises a PS-1024-QAM scheme.

* * * * *

UNITED STATES PATENT AND TRADEMARK OFFICE
CERTIFICATE OF CORRECTION

PATENT NO. : 10,236,991 B2
APPLICATION NO. : 15/910803
DATED : March 19, 2019
INVENTOR(S) : Jianjun Yu and Jianyang Shi It is certified that error appears in the above-identified patent and that said Letters Patent is hereby corrected as shown below:

In the Specification

In Column 7, Line 47, delete "SSW" and insert -- SSMF --, therefor.

In Column 8, Line 6, delete "15" and insert -- is --, therefor.

Signed and Sealed this
Third Day of November, 2020

Andrei Iancu
*Director of the United States Patent and Trademark Office*